United States Patent Office 2,784,891
Patented Mar. 12, 1957

2,784,891

COATING COMPOSITION

Harvey T. Thielke, Elmhurst, Ill.

No Drawing. Application March 19, 1956,
Serial No. 573,055

7 Claims. (Cl. 229—3.5)

This invention relates to plastic coating compositions and to a method for preparing them. The compositions are particularly suitable for coating cellulosic webs, such as paper. The coated webs provide an excellent packaging material for food and other materials which are subject to deterioration by oxygen or moisture.

An effective plastic packaging material from the standpoint of moisture and oxygen resistance is polyethylene. But when a thin film of polyethylene is applied to a paper web to make a low cost packaging material, the laminate has many shortcomings. It does not adhere well to paper, or other cellulose webs, and is extremely difficult to heat seal. Unlike most other thermoplastic resins, polyethylene has a sharp melting point, and does not soften over the range necessary to permit effective heat sealing on conventional equipment. Within a few degrees range it is converted from the solid to the liquid phase and, as pressure is applied, squeezes off the paper. To provide a moisture- and gas-proof package it is desirable to heat seal the seams and closure. Mechanical closures do not lend themselves readily to all types of packaging and are difficult to make gas tight. In addition to lacking heat sealability and adhesion to the web, polyethylene coatings become brittle and degrade in ultraviolet light. The coatings of the present invention obviate the disadvantages of polyethylene as a coating while retaining substantially all of the moisture, chemical and oxygen resistance thereof. They adhere readily and tenaciously to paper, foil, textiles, plastic films and cellulose webs, and heat seal under slight pressure to completely seal articles within a package made from the coated web. Although the coatings of the invention provide excellent physical and processing properties, they are very low in cost.

The novel composition consists of a homogeneous admixture of a hydrogenated animal or vegetable fat, rubber and polyethylene. The ranges of proportions, by weight, of the ingredients are as follows: 25–55% polyethylene, 15–30% rubber and 25–50% hydrogenated fat, the sum of the ingredients totaling 100%. The range of proportions is not highly critical but preferably should be within the limits recited. Sufficient rubber is incorporated to serve as a binder for the fat and polyethylene and impart tack to the mix. If less than about 25 parts of polyethylene are used, the softening point is lowered (which may result in blocking) and the chemical and moisture resistance is reduced. The fat, of course, contributes moisture vapor resistance, flexibility and thermoplasticity while reducing the cost of the mix in proportion to the amount added. The compositions are prepared by homogeneously mixing the rubber and the hydrogenated fat on a cold mill and subsequently adding the polyethylene which has been heated to soften it to jelly-like consistency. Care must be taken to keep the mill rolls cold during the entire mixing operation. This provides an end product having superior physical characteristics and prevents the material from adhering to the mill rolls. All of the heat required for dispersing the hydrogenated fat in the rubber is generated by friction of the rubber being worked between the mill rolls.

The coating composition may be applied to a web from a hot melt (225–265° F.) using spaced rolls or conventional spreading technique. A less desirable means of application is on a calender, the rolls of the calender being maintained at a temperature of about 250° F. At this temperature the coating composition is soft and pliable and can be bonded to the web without difficulty. The adhesion between the composition and the web is excellent, particularly to paper and other cellulosic webs. If desired, a powder, such as talc or starch, may be applied to the surface of the coating to impart a "satin" finish. Such coated webs can be heat sealed either with the web abutting the coating composition or with the coating composition in contact with itself. Good adhesion results in sealing either way.

The term "rubber" as used in this specification and in the claims is intended to include not only natural rubber but the several varieties of synthetic rubber including Buna N, Buna S, butyl and neoprene. I prefer to use a natural pale crepe in the preparation of the coated paper for food containers and the like because pale crepe has no odor. Where odor is not of importance, smoked sheets may be used. Buna N and neoprene are employed where exceptional oil resistance is required, although the composition of the invention prepared with natural rubber has remarkable oil resistance considering the lack of such resistance in the individual ingredients per se.

The polyethylene may have a softening point ranging from 180–240° F. The lower molecular weight polyethylenes, of course, have lower softening points and these are preferred for use in this invention. A softening point under 200° F. is preferred. These materials are well known in the trade and are produced commercially by many manufacturers. One of the best ethylene polymers for purposes of the invention is sold in pellet form under the name "Epolene N," manufactured by Eastman Chemical Company. This is generally referred to as a "low molecular weight polyethylene."

Suitable fats include odorless, colorless, hydrogenated vegetable oils and fats such as hydrogenated cottonseed oil, fish oil, lard and tallow. Completely hydrogenated fats are preferred, especially those having a melting point in the range of 125–150° F. One of the most compatible and best-performing hydrogenated fats for use in this invention is hydrogenated tallow having a softening point between 136° and 148° F. and an iodine value of about 5.0. These fats possess excellent resistance to rancidity and to the development of color. They may be purchased commercially in the form of flakes or beads.

The basic composition consisting of polyethylene, hydrogenated fat and rubber may be modified by including coloring pigments, flock or other fillers depending upon the purpose for which the coating is to be used.

A preferred composition was prepared as follows: Twenty-five parts by weight of pale crepe rubber were banded on a 2-roll rubber mill. Water was continuously circulated through the rolls of the mill to maintain them at about 60° F. The rubber was milled for a sufficient length of time to brake its nerve so that it banded well, but not long enough to render it soft and doughy. If all of the nerve is removed the tensile strength of the end product will be reduced. To the broken-down rubber were added 45 parts of hydrogenated tallow having a melting point of 148° F. This material is tasteless, colorless and odorless. It has a Titer value of 57° C. and an iodine value of 5.0. The fat was added gradually to the rubber and within a short time a homogeneous mixture resulted. The heat generated by the rubber is sufficient to soften the hydrogenated tallow so that it disperses throughout the rubber. Polyethylene having a molecular weight of about 2500 and a softening point of around 175° F. was heated to slightly above its softening temperature to a jelly-like consistency. Thirty parts of this material were then added to the mixture on the mill rolls. All the time the mixing was taking place, the water was circulated through the rolls to keep the temperature of the rolls below room temperature. I have found that if the temperature of the mix is permitted to rise by failure to remove the heat as it is generated, the physical properties of the final composition will be adversely affected, although heating after mixing does not so affect the composition. After the polyethylene had been thoroughly mixed with the fat and rubber, the mass was sheeted off of the mill. It was applied to a Kraft paper between a pair of rolls from a hot melt at 250° F., as shown in my copending application Serial No. 401,277, filed December 30, 1953. The coating composition at 250° F. had a consistency of tapioca or cold liquid glue. While being heated is changed from an opaque white color to amber and after cooling on the web it again became translucent white. The coating was applied in a thickness of about one mil, which is sufficient to impart good moisture vapor resistance, chemical resistance and heat sealability to the web.

The coated paper exhibited excellent resistance to oxygen, grease, citrus acids, and moisture vapor. It was flexible at temperatures in the vicinity of −20° F. The coating remained integrally bonded to the paper under severe flexure. The greatest advantage in the coated paper described was manifested in its ability to seal. Sealing was effectively carried out by applying pressure for one second at a temperature between 150° and 220° F. Permanent seals resulted both in adhering the coating to itself and adhering the coating to the base paper. The paper tore when an attempt was made to strip the plastic film therefrom. Similar tests made on the polyethylene coated fabric indicated that regardless of what temperature was used, no satisfactory seal was obtained between the coating and the paper. Satisfactory seals could be obtained, if great care was taken to regulate the temperature, in sealing the polyethylene to the polyethylene. The temperature required was about 250° F.

Some of the coated paper was cut into strips and tested as a sewing tape. It proved to be entirely satisfactory.

These plastic coatings have also been found to be ideally suited for coating metal foil. Preferably, the coating is applied to the paper side of a foil-paper laminate. Better adhesion is obtained by following this procedure, although for many purposes adhesion to the foil itself is satisfactory. The plastic coating has an elongation many times that of the foil and will continue to remain intact and impart moisture resistance after flexure has caused the foil to tear. A material of this kind can be produced for less than one-half the cost of a similar foil-paper laminate coated with polyethyelne.

The coated webs of the invention may be used to package small articles, such as tablets or lozenges, by placing the tablets between two sheets with the coated surfaces opposed, and heat sealing an area surrounding the tablets. They also fabricate well into bags or envelopes for containing bulk materials. All the seams, including the closure, are moisture-proof due to heat sealing. The webs of the invention are also ideally adapted for packaging metal parts or machinery which is subject to rust and corrosion during shipment. The parts may be completely sealed within a housing prepared from the coated web.

A method for applying my coating compositions which has proved to be very practical consists in spraying the heated material by airless atomization under 300–600 pounds per square inch pressure, applied by a suitable pump. In this method the material is not broken up by a stream of compressed air, as in the conventional spray gun, but atomization is effected entirely by hydraulic pressure and vapor pressure of the coating material itself, which is heated to 200–250° F. At this temperature the material is of spraying viscosity. This method of spraying permits laying down an even, uniform coating on an advancing web by using a gang of guns. The web is preferably heated by any suitable means before being advanced beneath the gang of spray guns. By eliminating atomizing air the disposition of the spray may be accurately controlled to minimize overspray or overlap by adjacent guns. No spray booth is required since all of the coating is deposited directly on the web. The coating material adheres more readily to the web because there is no air to cool the droplets expelled from the gun. Apparatus of this kind is sold commercially by Bede Products Corp. (a division of U. S. Automatic Corp.), Amherst, Ohio. This process has been particularly suitable for coating metal foil webs without a sheet of intermediate laminating paper. The adhesion proved to be very good.

From the foregoing it is apparent that I have provided a composition which serves well as a coating for paper and smiliar webs or textile fabrics, and which may be readily heat sealed. In spite of the advantages provided over plastic materials used for similar purposes, the compositions of the invention provide a decided cost advantage, primarily due to the low cost fat, but also because of the facility with which the coating may be applied.

What I claim as new and desire to secure by Letters Patent of the United States is:

1. A coating composition for webs consisting essentially of a homogeneous mixture of 25–55% polyethylene, 15–30% rubber, and 25–50% hydrogenated fat, the sum of the ingredients totaling 100% by weight.

2. A coating composition for webs consisting essentially of a homogeneous mixture of 30% polyethylene, 45% hydrogenated fat, and 25% rubber, the sum of the ingredients totaling 100% by weight.

3. A coated paper having a film thereon of the composition of claim 1.

4. A coated paper having a film thereon of the composition of claim 2.

5. A gas- and moisture-proof container having heat-sealed seams prepared from paper coated with a composition comprising a homogeneous admixture of 25–55% polyethylene, 15–30% rubber, and 25–50% hydrogenated fat, the sum of the ingredients totaling 100% by weight.

6. A coating composition for webs characterized by resistance to moisture vapor, oxygen and chemicals and by superior heat sealability consisting essentially of a mixture of polyethylene, hydrogenated tallow and natural rubber.

7. A method for preparing a plastic coating composition containing rubber, hydrogenated fat and polyethylene which comprises banding the rubber on a cold mill, adding the fat to the rubber and utilizing frictional heat only to assist dispersion of the fat with the rubber, adding presoftened polyethylene to the rubber-fat dispersion and milling the mixture until homogeneous while maintaining the mill rolls below room temperature.

References Cited in the file of this patent

UNITED STATES PATENTS

| | | |
|---|---|---|
| 2,366,672 | Mustin et al. | Jan. 2, 1945 |
| 2,414,300 | Hamilton | Jan. 14, 1947 |

FOREIGN PATENTS

| | | |
|---|---|---|
| 613,018 | Great Britain | Nov. 22, 1948 |